United States Patent
Hart

[15] 3,706,981
[45] Dec. 19, 1972

[54] INDICATING SYSTEM FOR DETECTING GASEOUS AND NON-GASEOUS STATES

[72] Inventor: Atlee S. Hart, 27530 Abington Road, Southfield, Mich. 48075

[22] Filed: Feb. 8, 1971

[21] Appl. No.: 113,202

[52] U.S. Cl.................340/244 R, 331/66, 340/234
[51] Int. Cl..............................................G08b 21/00
[58] Field of Search ..........340/234, 235, 244; 73/29; 331/66, 73, 116; 317/144, 147

[56] References Cited

UNITED STATES PATENTS 2,932,818    4/1960    Lubkin ............................340/244 R

*Primary Examiner*—Donald J. Yusko
*Assistant Examiner*—Daniel Myer
*Attorney*—William T. Sevald

[57] ABSTRACT

A detection system capable of distinguishing between a gaseous state and a non-gaseous state such as a liquid state and/or an ice state including a piezoelectric crystal, an exciter circuit connected to the crystal for producing an alternating current output at the mechanical frequency of the crystal, a measuring circuit connected to the output of the exciter circuit for determining increases and decreases in the amplitude of the output signal, and a signal device connected to the measuring circuit and responsive to increase and/or decrease in measurement of the signal output to produce a signal advisory of the change in the ambient physical conditions to which the crystal is subject in the selected location to advise the presence and/or absence of ice or liquid states relative to a gaseous state or to operate another system in response to the change.

4 Claims, 4 Drawing Figures

PATENTED DEC 19 1972  3,706,981
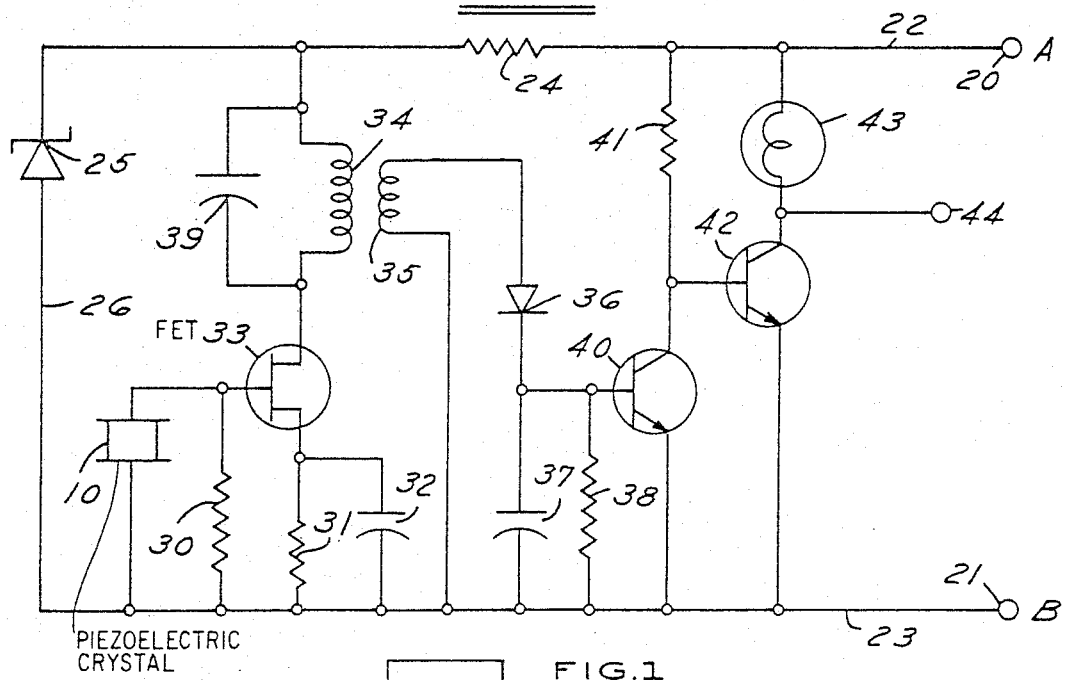
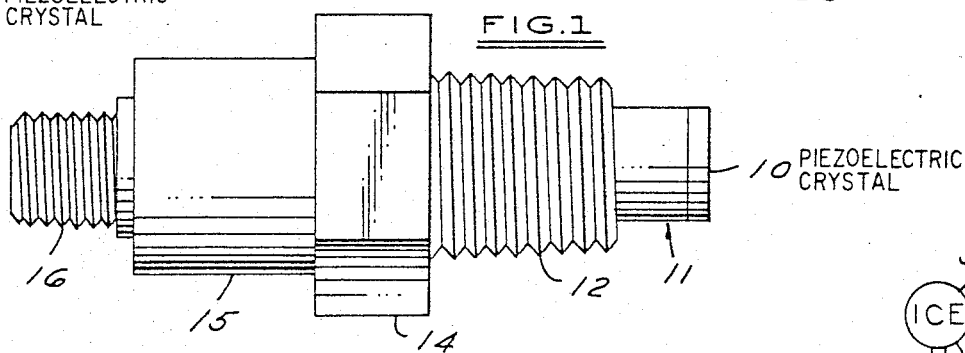
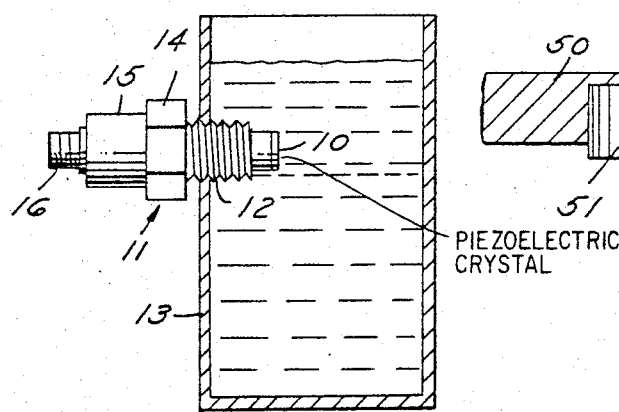
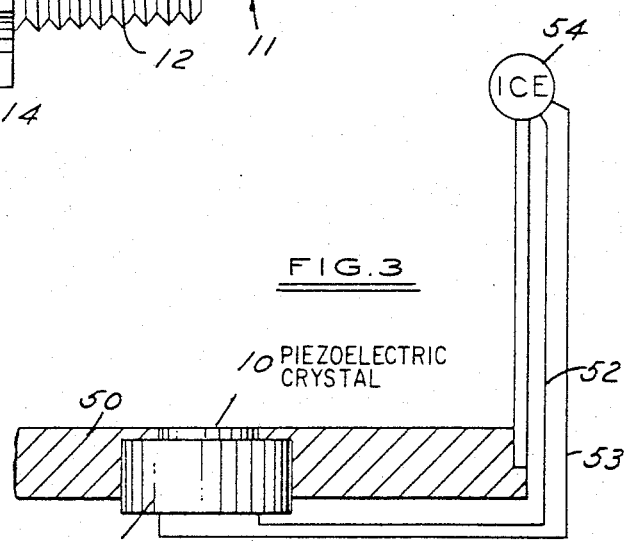
INVENTOR.
ATLEE S. HART
BY
*William P. Seald*
ATTORNEY

INDICATING SYSTEM FOR DETECTING GASEOUS AND NON-GASEOUS STATES

This invention relates to a system to detect and signal the change in ambient physical conditions from a gas state to a non-gas state such as a liquid and/or ice state; or the reverse; dependant on the state considered normal.

An object of the invention is to provide a system for detecting the formation of ice where considered undesirable such as on airplane wings, in carburetors, on refrigeration coils, on roads, bridges, etc., and to provide a warning signal to pilots, drivers, and others.

An object of the invention is to provide a system for detecting and warning of the absence of ice where considered desirable such as in food freezers, etc.

An object of the invention is to provide a system for detecting and warning of the absence of a liquid where considered desirable, such as a drop below the desired level of oil in the crankcase of an engine, coolant in a radiator, etc.

An object of the invention is to provide a system for detecting and warning of the presence of a liquid where considered not desirable such as rising above a desired level of water in the bilge of boats and in tanks, etc.

These and other objects of the invention will become apparent by reference to the following description of a system embodying the invention, taken in connection with the accompanying drawing, in which:

FIG. 1 is a side elevational view of a crystal and supporting body including mounting means.

FIG. 2 is a reduced showing of the device seen in FIG. 1 mounted on a tank.

FIG. 3 is a schematic showing of the device mounted on a bridge surface subject to icing conditions; and FIG. 4 is a schematic wiring diagram including the crystal, exciter circuit, measuring circuit, and warning signal device.

Referring now to the drawing wherein like numerals refer to like and corresponding parts throughout the several views, the device and system disclosed therein to detect a change in ambient physical conditions and to provide a signal on a change occuring comprises a quartz, barium titanate, lead zirconate titanate, or other suitable crystal 10 which is piezoelectric in character to provide a probe or sensor having a natural mechanical frequency of vibration in air or gas at a certain amplitude and a damped amplitude of vibration in mediums more viscous than gas such as ice and liquid. The crystal 10 is mounted on a body 11 which includes a threaded nose 12 for mounting the body 11 on a member such as a tank 13, a nut portion 14 for turning with a wrench, a housing 15 for containing electrical equipment, and a connector 16 for making electrical connections to a power source, to another system controlled, etc.

Referring to FIG. 3, the crystal 10 is integrated in a bridge road surface 50. The amplitude of vibration of the crystal 10 is fed to the circuit in a housing 51. The output signal from the circuits in the housing 51 is supplied through wires 52 and 53 to a warning lamp 54.

Referring to FIG. 4, power is supplied to terminals 20 and 21 and lines 22 and 23 respectively. A current limiting resistor 24 in line 22 and a zener diode 25 in line 26 provide a regulated voltage for the oscillator circuit now described. Resistors 30 and 31 and a capacitor 32 form a biasing network for a transistor 33.

An inductor 34 and a capacitor 39 are connected through the transistor 33 and form an anti-resonant circuit at the frequency at which the crystal 10 is anti-resonant in the desired crystal mode. This causes the crystal 10 to vibrate and an alternating voltage of the crystal frequency is supplied across inductor 34.

In this arrangement, the voltage may be about 10 volts at a frequency of 300 KHZ. An inductor 35, is a link which is inductively coupled with the inductor 34 forming an air-core transformer. The voltage which is induced into the inductor 35 by the inductor 34 is half-wave rectified by a diode 36 and filtered by a capacitor 37 and a resistor 38. This results in direct current voltage across the capacitor 37 and the resistor 38. This voltage acts as a forward bias to hold a transistor 40 in an "on" state.

With transistor 40 on, the bias current through a resistor 41 is shunted to ground and a transistor 42 is in the "off" state and a signal device or indicator 43 is off.

Should the vibration of the crystal 10 be damped by the application or immersion of the crystal 10 in ice or liquid, the "on" bias to transistor 33 is substantially reduced or eliminated and little or no output voltage lies across the inductor 34.

This reduction or loss of voltage across the inductor 34 results in a loss of forward bias on a transistor 40 and the transistor 40 turns off. This in turn allows a forward bias current from a resistor 41 to flow to a transistor 42. This turns the transistor 42 on and passes current through an indicator 43. The output signal to the indicator 43 is also available at 44 for control of remote devices, functions, or signals.

The position and/or location of the crystal 10 and/or the electrical logic may be established to provide operation of a signal in either mode; that is, to activate the signal when the crystal is damped by liquid or undamped by liquid or to activate the signal when the crystal is damped by ice or undamped by the absence of ice.

The invention provides a simple, economical and reliable system and device for the detection of ice which has long been sought by the aircraft, air conditioning, refrigeration, transportation, and road safety industries, among others.

In aviation, ice is a substantial flight hazard of two types; structural ice and carburetor ice. The latter is particularly insidious because it is concealed from the pilot and where the carburetor may be as much as 60°F lower in temperature than the ambient air with the result that the air in passing through the carburetor is frequently cooled to a temperature below its dew point and the moisture contained in the air is condensed out and freezes on the internal surfaces of the carburetor.

Aircraft equipped with carburetors are normally also equipped with a valve by which the pilot may channel heated air through the carburetor. The invention provides a ready automatic means of determining exactly when and in what quantity to apply heat to the carburetor upon the actual formation of ice and to operate the heat valve.

Another application of the invention is the detection of structural ice on aircraft and in air conditioning and refrigeration systems so that the system may initiate automatic operation of de-icing means, defrosting cycles, and perform other tasks.

Another application of the invention is road surface ice on bridges such as shown in FIG. 3. Here there is no residual ground heat factor and upon icing conditions the road surface of the bridge becomes iced prior to the remainder of the road. With the device of the invention on the bridge road surface or other road surfaces, the lamp 54 will provide a warning. While a bridge is used for illustration, the device of the invention may be used on other road surfaces, sidewalks, ramps, school crossings, etc.

Another application of the device is the sensing of liquid levels because of its unique set of attributes which make it desirable in may applications.

The desirable attributes and characteristics of the device of the invention include all solid-state with no moving parts, high reliability; extreme sensitivity and accuracy; capabilities of detection of non-conductive fluids such as oils and gasolines; ability to operate over extremely wide temperature ranges; and no fire hazard.

While only a few exemplary embodiments of the device has been shown and described with exemplary circuits, it will be understood that the scope of the invention is defined by the appended claims.

I claim:

1. A detecting system for distinguishing between a gaseous environmental physical condition and environmental physical conditions other than gaseous such as liquid, ice, etc., by a stronger output signal in the presence of a gas, and a weaker output signal in the presence of conditions other than gas, comprising,
    a piezoelectric crystal exposable to environmental physical conditions in a selected location;
    said crystal having a mechanical frequency of vibration affected by the density of ambient physical conditions resulting in a normal undamped relatively stronger amplitude of vibration in the presence of gaseous conditions and a damped weaker amplitude of vibration in the presence of conditions other than gaseous;
    a body supporting said crystal;
    means on said body for mounting said body on a member to expose said crystal to ambient physical conditions in a selected location;
    an exciter circuit including said crystal producing an alternating current output at the normal frequency of said crystal;
    a signal circuit connected to said exciter circuit output for measuring said exciter circuit output; and
    a signal device connected to said signal circuit responsive to measurement of said output to advise change in ambient physical conditions occurring bi-directionally between a gaseous state and a non-gaseous state at the selected location to provide a signal indicating that a change has occurred in ambient physical conditions and indicative of the present state(.);
    said exciter circuit including a current limiting resistor and a zener diode to provide a regulated voltage for an oscillator circuit leading to said piezoelectric crystal;
    said exciter circuit having an oscillator circuit leading from said piezoelectric crystal including an FET transistor, resistors, and a capacitor forming a biasing network for said transistor; and
    an inductance and a second capacitor connected through said transistor;
    said circuit causing said crystal to vibrate and produce an alternating voltage of the crystal frequency across said inductance; should the vibration of said crystal be damped, the "ON" bias to said transistor is reduced and output voltage is reduced.

2. In a system as set forth in claim 1, an inductor coupled with said inductance receiving induced voltage, a diode rectifying said voltage to half wave D.C., a capacitor and a resistor filtering the direct current from said diode, a second transistor receiving said direct current holding it in the "ON" state;
    a third transistor and a resistor receiving voltage from said second transistor normally biasing said third transistor "OFF", and an indicator connected to said third transistor;
    should the predetermined vibration of said piezoelectric crystal be damped, "ON" bias to said second transistor is reduced and it turns to an "OFF" state whereupon said third transistor loses its "OFF" bias and turns to an "ON" state powering said indicator.

3. A detecting system including an oscillator circuit for responding to the presence and absence of a gaseous condition relative to a non-gaseous condition, comprising
    a piezoelectric crystal exposable to environmental gaseous and non-gaseous conditions;
    said crystal producing vibrations when powered;
    means powering said crystal to cause said crystal to vibrate including a current limiting resistor and a zener diode leading to an oscillator to provide a regulated voltage output to said oscillator circuit and said crystal;
    an oscillator circuit including a field effect transistor having an input side, a first output side, and a second output side; said input side being connected to said crystal output; at least one resistor and a capacitor connected to said first output side of said transistor forming a bias for said transistor; an inductance and a capacitor connected to said second output side of said transistor for receiving voltage from said crystal through said transistor;
    said crystal when in a gaseous condition being undamped to produce voltage to modulate said transistor bias to cause said transistor to oscillate and when in a non-gaseous condition being damped to produce unmodulated transistor bias to cause said transistor not to oscillate;
    the presence of voltage at said inductance thereby providing a signal indicative of a gaseous state at said crystal and the absence of voltage at said inductance thereby providing a signal indicative of a non-gaseous state at said crystal.

4. In a system as set forth in claim 3, an inductor coupled with said inductance receiving induced voltage, a diode rectifying said voltage to half wave D.C., a capacitor and a resistor filtering the direct current from said diode, a second transistor receiving said direct current holding it in the "ON" state;
    a third transistor and a resistor receiving voltage from said second transistor normally biasing said third transistor "OFF", and an indicator connected to said third transistor;
    should the predetermined vibration of said piezoelectric crystal be damped, "ON" bias to said second transistor is reduced and it turns to an "OFF" state whereupon said third transistor loses its "OFF" bias and turns to an "ON" state powering said indicator.

* * * * *